United States Patent
Dubroeucq et al.

(10) Patent No.: US 8,804,965 B2
(45) Date of Patent: Aug. 12, 2014

(54) METHODS FOR DECRYPTING, TRANSMITTING AND RECEIVING CONTROL WORDS, RECORDING MEDIUM AND CONTROL WORD SERVER TO IMPLEMENT THESE METHODS

(75) Inventors: Gilles Dubroeucq, Saint Piat (FR); Erwann Magis, Paris (FR)

(73) Assignee: Viaccess, Paris (FR)

( * ) Notice: Subject to any disclaimer, the term of this patent is extended or adjusted under 35 U.S.C. 154(b) by 0 days.

(21) Appl. No.: 13/695,968

(22) PCT Filed: May 3, 2011

(86) PCT No.: PCT/EP2011/057066
§ 371 (c)(1),
(2), (4) Date: Nov. 2, 2012

(87) PCT Pub. No.: WO2011/138333
PCT Pub. Date: Nov. 10, 2011

(65) Prior Publication Data
US 2013/0046969 A1    Feb. 21, 2013

(30) Foreign Application Priority Data
May 4, 2010    (FR) ...................................... 10 53467

(51) Int. Cl.
*H04L 9/08*    (2006.01)
(52) U.S. Cl.
USPC .......................................... 380/278; 713/155
(58) Field of Classification Search
CPC ......................................................... H04L 9/08
USPC ........................... 713/150, 155; 380/220, 278
See application file for complete search history.

(56) References Cited

U.S. PATENT DOCUMENTS

| | | | |
|---|---|---|---|
| 2004/0083177 A1* | 4/2004 | Chen et al. ...................... | 705/50 |
| 2008/0137850 A1* | 6/2008 | Mamidwar .................... | 380/202 |
| 2008/0192927 A1* | 8/2008 | Stransky ......................... | 380/42 |
| 2008/0301437 A1* | 12/2008 | Chevallier et al. ............ | 713/155 |
| 2009/0323949 A1* | 12/2009 | Chieze et al. ................. | 380/239 |

FOREIGN PATENT DOCUMENTS

| | | |
|---|---|---|
| WO | WO 01/95613 | 12/2001 |
| WO | WO 2009112966 A2 * | 9/2009 |
| WO | WO 2009/112966 | 12/2009 |

OTHER PUBLICATIONS

Menezes A. et al., "Handbook of Applied Cryptography, Chapter 13 (Key Management Techniques)", Jan. 1, 1997, Handbook of Applied Cryptography, CRC Press, Boca Raton Fl., pp. 547-555.
Francis et al., "Countermeasures for attacks on satellite TV cards using open receivers," Australasian Information Security Workshop.: Digital Rights Management, Nov. 6, 2004, pp. 1-6.

* cited by examiner

*Primary Examiner* — Andrew Nalven
*Assistant Examiner* — Mary Li
(74) *Attorney, Agent, or Firm* — Occhiuti & Rohlicek LLP

(57) ABSTRACT

A method of transmitting control words to terminals that are mechanically and electronically independent of one another includes transmitting, to a terminal, an absent control word in response to a request from the terminal that contains a cryptogram corresponding to the absent control word, for the terminal, selectively determining a number of additional control words to be transmitted to the terminal as a function of a probability that security of the additional control words is compromised, and transmitting, to the terminal, in addition to the absent control word, the determined number of additional control words to enable the terminal to descramble at least one additional cryptoperiod of the multimedia content in addition to the cryptoperiod of the multimedia content that can be descrambled using the absent control word.

12 Claims, 2 Drawing Sheets

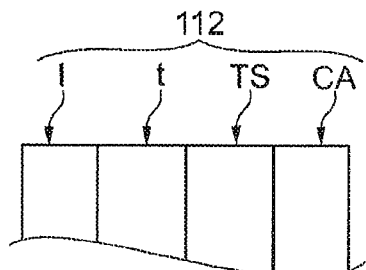
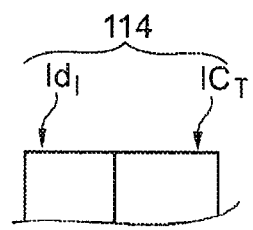
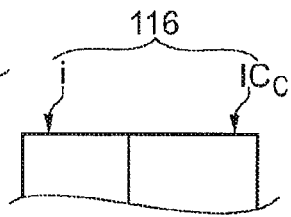
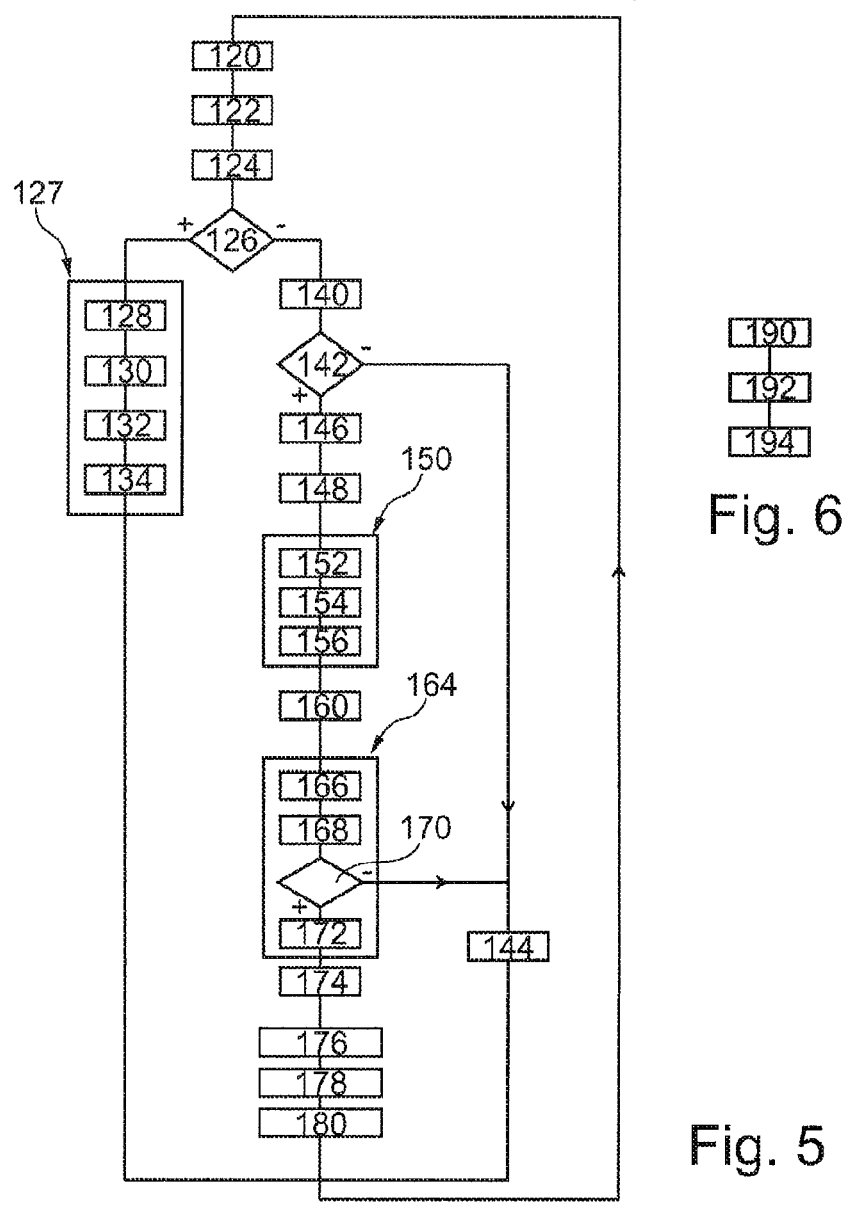

METHODS FOR DECRYPTING, TRANSMITTING AND RECEIVING CONTROL WORDS, RECORDING MEDIUM AND CONTROL WORD SERVER TO IMPLEMENT THESE METHODS

CROSS-REFERENCE TO RELATED APPLICATIONS

This application is the National Stage of International Application No. PCT/EP2011/057066, filed on May 3, 2011, which claims the benefit of the priority date of French Application No. 1053467, filed on May 4, 2010. The content of these applications is hereby incorporated by reference in its entirety.

FIELD OF DISCLOSURE

The invention pertains to a method for decrypting control words for terminals that are mechanically and electronically independent of one another. The invention also pertains to a method for transmitting and receiving control words to implement the method for decrypting. The invention also pertains to an information-recording medium and to a control word server to implement this method.

BACKGROUND

There are methods for enciphering control words in which:
in response to the absence, in any one of the terminals, of one or more control words $CW_c$ to descramble one or more cryptoperiods of a multimedia content, this terminal transmits, to a control word server, a request containing the cryptogram or cryptograms of one or more absent control words and, in response
the control-word server transmits the absent control word or words to this terminal.

The term "multimedia content" designates an audio and/or visual content to be rendered in a form directly perceptible and comprehensible to a human being. Typically, a multimedia content corresponds to a succession of images forming a film, a television show or advertising material. A multimedia content can also be an interactive content such as a game.

There are known ways of broadcasting several multimedia contents at the same time. To this end, each item of multimedia content is broadcast on its own channel. The channel used to transmit a multimedia content is also known as a "station". A channel typically corresponds to a television station. This enables a user to choose simply the multimedia content that he wishes to view by changing channels.

To secure and subject the viewing of multimedia contents to certain conditions, such as the payment of a subscription for example, the multimedia contents are broadcast in scrambled form and not in plain or unencrypted form. More specifically, each multimedia content is divided into a sequence of cryptoperiods. Throughout the duration of a cryptoperiod, the conditions of access to the scrambled multimedia content remain unchanged. In particular, throughout the duration of a cryptoperiod, the multimedia content is scrambled with the same control word. Generally, the control word varies from one cryptoperiod to another. Furthermore, the control word is generally specific to a multimedia content. Thus if, at a given instant, N multimedia contents are broadcast simultaneously on N channels, then there are N different and independent control words each used to scramble one of these multimedia contents.

Here, the terms "scramble"/"descramble" and "encrypt"/"decrypt" are considered to be synonyms.

The plain or unencrypted multimedia content corresponds to the multimedia content before it is scrambled. This content can be made directly comprehensible to a human being without recourse to descrambling operations and without dictating certain conditions on the viewing of this content.

The control words needed to descramble the multimedia contents are transmitted synchronizedly with the multimedia contents. For example, the control words needed to descramble the $t^{th}$ cryptoperiod are received by each terminal during the $(t-1)^{th}$ cryptoperiod. To this end, for example, the control words are multiplexed with the scrambled multimedia content.

To secure the transmission of the control words, these words are transmitted to the terminals in the form of cryptograms. The term "cryptogram" herein designates a piece of information that is not sufficient by itself to retrieve the control word in plain form. Thus, if the transmission of the control word is intercepted, knowledge of the control word cryptogram alone does not make it possible to retrieve the control word by which the multimedia content can be descrambled. To retrieve the plain control word, i.e. the control word used to directly descramble the multimedia content, it must be combined with a piece of secret information. For example, the cryptogram of the control word is obtained by encrypting the plain control word with a cryptographic key. In this case, the secret information and the cryptographic key are the ones used to decrypt this cryptogram. The cryptogram of the control word can also be a reference to a control word stored in a table containing a multitude of possible control words. In this case, the secret information is the table associating a plain control word with each reference.

The secret information should be kept in a secure place. To this end, it has already been proposed to store the secret information:
either in security processors such as chip cards directly connected to each of the terminals,
or more recently in control-word servers common to several terminals.

In the latter case, the terminals are devoid of chip cards. These terminals are then called cardless terminals.

The control-word server is connected to each of the terminals by a long-distance information-transmission network such as the Internet. When a control-word server is used, the cryptograms of the control words are first of all transmitted to the different terminals and then forwarded by these terminals to the control-word server. This procedure has several advantages. In particular, the information-transmission network used to broadcast the multimedia contents and the cryptograms of the control words can be different from the one used to connect the terminals to the control-word server. For example, the network for broadcasting multimedia content and cryptograms of the control words is a one-way network with a large bandwidth, for example a satellite network. Conversely, the network connecting the terminals to the control-word server is a two-way network with a bandwidth that may be smaller.

Then, this simplifies the time synchronization between the broadcasting of the multimedia contents and the broadcasting of the cryptograms of the corresponding control words.

The control-word server has the function of decrypting the cryptograms of the control words transmitted by the terminals and then sending the decrypted control word back to each of these terminals. Thus, in a way, the control-word server plays the role of a chip card common to several terminals that are mechanically and electrically independent of one another.

Terminals that are electronically independent of one another are terminals that can work autonomously and have no shared electronic part or software.

When a terminal needs a control word to descramble a multimedia content, it sends the control-word server a request containing the cryptogram of the control word. In response, the control-word server decrypts this cryptogram and then sends the decrypted control word to the terminal which can then descramble the desired multimedia content.

The multimedia contents broadcast over the different channels are temporally coordinated with one another. For example, the multimedia content broadcasting times are set so as to comply with the broadcasting times indicated in a pre-established program schedule. Each terminal on a given channel therefore receives substantially the same multimedia content at the same time. These multimedia contents are then said to be "live" or "linearized" because the user does not control their instant of transmission.

Conversely, certain multimedia contents are transmitted on demand. This is for example the case with services such as video on demand services. This is also the case when the multimedia contents are recorded locally from the terminal or remotely from the network and when the activation and running of the display are controlled by the user. A service of this kind is known for example by the acronym NPVR (Network Private Video Recorder). It may also be a service by which it is possible to go back in time or postpone the display as in the service known as NTS (Network Time Shifting). In these latter cases, the multimedia content is called a "delinearized" content because it is the user who decides the moment at which the terminal will play this content.

In general, the number of encrypted control words contained in a request is limited to one or two to increase the security of the cryptographic system. Indeed, if the number of encrypted control words contained in a request increases, then the number of plain control words stored in each terminal to descramble a same multimedia content increases. Now, the greater the number of plain control words stored in the terminals, the greater the risk that the security of the system might be compromised. For example, a large number of control words stored in each terminal facilitates attacks such as those involving the sharing of control words. In this form of attack, the plain control words obtained by a terminal that has paid a subscription to decrypt these control words are sent illicitly to the other terminals that have not paid a corresponding subscription.

Each terminal thus sends the control word server a request at each cryptoperiod or at every two cryptoperiods.

The processing of a request by the control word server takes a certain amount of time and the greater the number of requests to be treated the greater the workload of this server. The greater the workload, the greater the computing power needed for the control word server.

It is therefore desirable to be able to reduce the workload of the control word server to use servers having a more restricted computation power.

SUMMARY

The invention is aimed at meeting this aim by proposing a decrypting method in which the control word server:
  determines selectively for each terminal, a number of additional control words $CW_s$ to be transmitted to the terminal as a function of the probability that the security of these additional control words is compromised, and transmits to this terminal, in addition to the absent control words $CW_c$, the determined number of additional control words $CW_s$ to enable the terminal to descramble additional cryptoperiods of the multimedia content in addition to the cryptoperiods that can be descrambled by means of the absent control words $CW_c$ required.

The fact of sending additional control words in addition to the absent control words increases the number of control words present in the terminal and therefore reduces the frequency of the requests transmitted by this terminal to the control word server. This reduction in frequency results in a reduction in the work load of the control word server.

Furthermore, this increase in the number of control words stored in the terminal is not done to the detriment of the security of the cryptographic system since this increase is implemented only for certain selectively chosen terminals where the risk of the stored control words being compromised is low.

An object of the invention is also a method for transmitting control words to terminals that are mechanically and electronically independent of one another to implement the above method, this method comprising:
  the transmission to any one of these terminals of one or more absent control words $CW_c$ in response to a request from this terminal containing the cryptogram or cryptograms of the absent control words,
  the determining, selectively for each terminal, of a number of additional control words $CW_s$ to be transmitted to the terminal as a function of the probability that the security of the additional control words is compromised, and
  the transmission to this terminal, in addition to the absent control words $CW_c$, of the determined number of additional control words $CW_s$ to enable the terminal to descramble additional cryptoperiods of the multimedia content in addition to the cryptoperiods that can be descrambled by means of the absent control words $CW_c$ required.

The embodiments of this method of transmission of control words may comprise one or more of the following characteristics:
  The number of additional control words is adjusted as a function of:
    estimations of the number of requests to be processed by the control word server during several coming cryptoperiods, and
    a law delivering a number of additional control words to be transmitted enabling the more uniform distribution, over the coming cryptoperiods, of the number of requests to be processed by the control word server during each of these coming cryptoperiods as a function of said estimations;
  the control word server estimates the number of requests to be processed during a coming cryptoperiod on the basis of the number of additional control words transmitted to the terminals by this server during the past cryptoperiods and the present cryptoperiod;
  the number of additional control words is determined as a function of a random number, drawn randomly or pseudo-randomly, in a range of numbers whose extent is a function of the probability that the security of the control words stored in the terminal is compromised;
  the number of additional control words $CW_s$ is also adjusted as a function of the probable number of successive cryptoperiods of this multimedia content which will be descrambled by this terminal;
  the probability that the security of the additional control words $CW_s$ is compromised depends on an identifier of the terminal and/or a counter of operating errors of this terminal and/or an identifier of the multimedia content.

These embodiments of the method for transmitting control words furthermore have the following advantages:

determining the number of additional control words to be transmitted as a function of estimations of the number of requests to be processed by the control word server per cryptoperiod smoothens the workload of the control word server over several cryptoperiods, determining the number of additional control words as a function of a random number smoothens the workload of the control word server over several cryptoperiods without making use of an estimation of the workload of this server on each of these cryptoperiods;

adjusting the number of additional control words as function of the probable number of successive cryptoperiods of this multimedia content to be descrambled further limits the workload of the control word server in preventing an excessive sending of additional control words.

An object of the invention is also a method for receiving control words by means of a terminal to implement the above method, wherein:

in response to the absence in this terminal of one or more control words $CW_c$ to descramble one or more cryptoperiods of a multimedia content, this terminal sends the control word server a request containing the cryptogram or cryptograms of one or more absent control words, and the terminal receives, in addition to the absent control words required, a determined number of additional control words to enable this terminal to descramble the additional cryptoperiods of the same multimedia content in addition to the cryptoperiods capable of being descrambled by means of the absent control words $CW_c$ required.

An object of the invention is also an information-recording medium comprising instructions to implement the above methods when these instructions are executed by an electronic computer.

Finally, an object of the invention is also a control word server for transmitting control words towards terminals that are mechanically and electronically independent of one another, to implement the above method, this server being capable of:

transmitting one or more absent control words $CW_c$ to any one of these terminals in response to a request from this terminal containing the cryptogram or cryptograms of the absent control words, determining, selectively for each terminal, a number of additional control words $CW_s$ to be transmitted to the terminal as a function of the probability that the security of the additional control words is compromised, and transmitting to this terminal, in addition to the absent control words $CW_c$, the determined number of additional control words $CW_s$ to enable the terminal to descramble additional cryptoperiods of the multimedia content in addition to the cryptoperiods descrambled by means of the required absent control words $CW_c$.

BRIEF DESCRIPTION OF THE FIGURES

The invention will be understood more clearly from the following description, given purely by way of a non-restrictive example and made with reference to the appended drawings, of which:

FIGS. 2 to 4 are schematic illustrations of tables used in the system of FIG. 1, FIG. 5 is a flowchart of a method for decrypting control words by means of the system of FIG. 1, and FIG. 6 is a flowchart of a method for updating a table of control words.

In these figures, the same references are used to designate the same elements.

DETAILED DESCRIPTION

Figure 1:
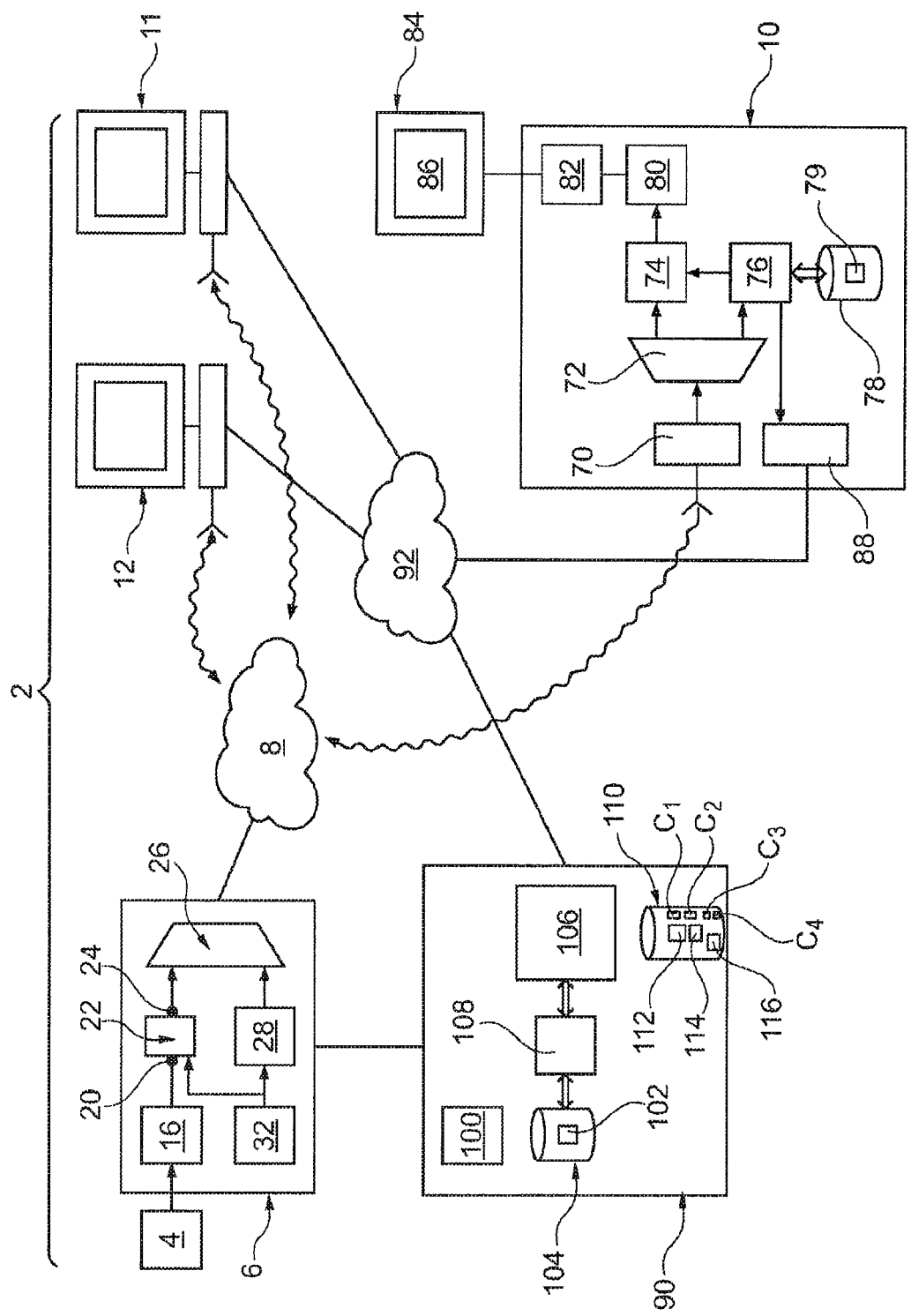
FIG. 1 is a schematic illustration of a system for sending and receiving scrambled multimedia contents.

Here below in this description, the characteristics and functions well known to those skilled in the art shall not be described in detail. Furthermore, the terminology used is that of systems of conditional access to multimedia contents. For further information on this terminology, the reader may refer to the following document:

"Functional Model of Conditional Access System", EBU Review, Technical European Broadcasting Union, Brussels, BE, n° 266, 21 Dec. 1995.

FIG. 1 shows a system 2 for sending and receiving scrambled multimedia contents. The multimedia contents sent are linearized or de-linearized multimedia contents. For example, a multimedia content corresponds to a sequence of an audiovisual program such as a television broadcast or a film.

Here below in this description, the system 2 is described in the particular case in which the multimedia contents are linearized.

The plain multimedia contents are generated by one or more sources 4 and transmitted to a broadcasting device 6. The device 6 broadcasts the multimedia contents simultaneously to a multitude of reception terminals through an information-transmission network 8. The multimedia contents broadcast are time-synchronized with one another so as to comply for example with a pre-established program schedule.

The network 8 is typically a long-distance information-transmission network such as the Internet or a satellite network or any other broadcasting network such as the one used to transmit digital terrestrial television (DTTV).

To simplify FIG. 1, only three reception terminals 10 to 12 are shown.

The device 6 includes an encoder 16 which compresses the multimedia contents that it receives. The encoder 16 processes digital multimedia contents. For example, this encoder works in compliance with the MPEG2 (Moving Picture Expert Group-2) standard or the UIT-T H264.

The compressed multimedia contents are directed towards an input 20 of a scrambler 22. The scrambler 22 scrambles each compressed multimedia content to make its viewing conditional on certain terms such as the purchase of a title of access by the users of the reception terminals. The scrambled multimedia contents are rendered at an output 24 connected to the input of a multiplexer 26

The scrambler 22 scrambles each compressed multimedia content using a control word $CW_{i,t}$ given to it as well as to a condition access system 28 by a key generator 32. The system 28 is better known by the acronym CAS (Conditional Access System). The index $i$ is an identifier of the channel on which the scrambled multimedia content is broadcast and the index $t$ is an identifier of the cryptoperiod scrambled with this control word. Here below in this description, the cryptoperiod currently descrambled by the terminals is the cryptoperiod $t-1$.

Typically, this scrambling is compliant with a standard such as the DVB-CSA (Digital Video Broadcasting-Common Scrambling Algorithm), ISMA Cryp (Internet Streaming Media Alliance Cryp), SRTP (Secure Real-time Transport Protocol), or other such standards.

The system 28 generates ECMs (Entitlement Control Messages) containing at least the cryptogram $CW^*_{i,t}$ of the control word $CW_{i,t}$ generated by the generator 32 and used by the scrambler 22 to scramble the cryptoperiod t of channel i. These messages and the scrambled multimedia contents are multiplexed by the multiplexer 26, these messages and scrambled multimedia contents being respectively given by the conditional access system 28 and the scrambler 22 and then transmitted on the network 8.

The system 28 also inserts into each ECM:
the identifier i of the channel,
the cryptograms $CW^*_{i,t}$ and $CW^*_{i,t+1}$ of the control words $CW_{i,t}$ and $CW_{i,t+1}$ enabling the cryptoperiods t and t+1 of the channel i to be descrambled,
the numbers t and t+1 identifying the cryptoperiods descrambled with the control words $CW_{i,t}$ and $CW_{i,t+1}$,
Timestamps $TS_t$ and $TS_{t+1}$, which identify the instants at which the cryptoperiods t and t+1 must be played,
access rights DA designed to be compared with access entitlements acquired by the user, and
a MAC signature or a cryptographic redundancy to verify the integrity of the ECM.

The timestamps are defined in relation either to an absolute origin independent of the broadcast multimedia content or in relation to a relative origin pertaining to a broadcast multimedia content. For example, a relative origin may be the start of the film when the multimedia content is a film.

The same identifier i is inserted in all the ECMs containing a cryptogram $CW^*_{i,t}$ to descramble the multimedia contents broadcast on a same channel.

By way of an illustration here, the scrambling and the multiplexing of the multimedia contents is compliant with the DVB-Simulcrypt (ETSI TS 103 197) protocol. In this case, the identifier i may correspond to a unique "channel ID/stream ID" pair on which all the requests for the generation of ECM messages for this channel are sent.

For example, the reception terminals 10 to 12 are identical and only the terminal 10 is described in greater detail.

The reception terminal 10 includes a receiver 70 of broadcast multimedia contents. This receiver 70 is connected to the input of a demultiplexer 72 which transmits on the one hand the multimedia content to a descrambler 74 and on the other hand the ECM and EMM (Entitlement Management Message) messages to a processor 76. The processor 76 processes confidential information such as cryptographic keys. In order that the confidentiality of this information may be preserved, it is designed to be as robust as possible against attempted attacks by computer hackers. It is therefore more robust against these attacks than the other components of the terminal 10. This robustness is obtained for example by implementing a software module dedicated to the protection of secret information.

The processor 76 is made for example by means of programmable electronic computers capable of executing instructions recorded on an information-recording medium. To this end, the processor 76 is connected to a memory 78 containing the instructions needed to execute the methods of FIG. 5.

The memory 78 also contains:
a cryptographic certificate to authenticate the terminal 10, and
a local table 79 of control words.

The descrambler 74 descrambles the scrambled multimedia content using the control word transmitted by the processor 76. The descrambled multimedia content is transmitted to a decoder 80 which decodes it. The decompressed or decoded multimedia content is transmitted to a graphic card 82 which drives the display of this multimedia content on a display unit 84 equipped with a screen 86.

The display unit 84 provides a plain display of the multimedia content on the screen 86.

The terminal 10 also has a sending unit 88 used to set up a secured connection with a headend 90 by means of an information-transmission network 92. For example, the network 92 is a long-distance information-transmission network and more specifically a packet-switching network such as the Internet. The secured connection is for example a tunnel secured by means of a cryptographic certificate.

The headend 90 has a module 100 for managing the access entitlements of the different users of the system 2. This module 100 is better known as a "subscriber authorization system" This module 100 generates a database 102 and keeps it up to date. With each user identifier, the database 102 associates the access entitlements acquired by this user. This database 102 is stored in a memory 104.

The headend 90 also has a control word server 106 connected to an access-right checking module 108 and a memory 110. The memory 110 contains:
a table 112 of control words,
a table 114 of indices of trust in the terminals
a table 116 of indices of criticality of the multimedia contents, and
operating error counters $C_1$, $C_2$, $C_3$ and $C_4$ associated with each terminal.

The working of the error counters $C_1$ to $C_4$ is described in greater detail with reference to FIG. 5.

Typically, the server 106 is made out of programmable electronic computers capable of executing instructions recorded in an information-recording medium. To this end, the memory 110 also has instructions to execute the methods of FIG. 5 or 6.

An example of a structure of the table 112 is shown in greater detail in FIG. 2. Each row of the table 112 corresponds to a recording. The table 112 has several recordings. Each recording corresponds to a cryptoperiod. In particular, the table 112 contains recordings for more than three successive coming cryptoperiods for each multimedia content. Each of these recordings contains the following fields:
a field i containing the identifier i of the broadcast channel,
a field t containing the number of the cryptoperiod,
a field $TS_t$ containing the timestamp associated with the cryptoperiod t,
a field CA containing the conditions of access to this cryptoperiod t.

The structure of the table 79 is identical for example to the structure of the table 112.

FIG. 3 gives a more detailed view of an example of a structure for the table 114. With each identifier $Id_T$ of a terminal, the table 114 associates a trust index $IC_T$ for this terminal. The trust index $IC_T$ represents the probability that the security of the control words recorded in this terminal has been compromised. The security of a terminal will be considered to have been compromised when the control words recorded or stored in this terminal are used for illicit purposes, for example to enable the descrambling of multimedia contents by other terminals that do not have access entitlements permitting a descrambling of this kind. Here below in this description, the lower the value of the index, the greater the probability that the security of the control words stored in the terminal has been compromised.

Here, the index $IC_T$ represents the probability that the hardware means implemented in this terminal are withstanding a hacking attempt. It therefore represents the level of difficulty in illicitly obtaining and using the control words stored in this terminal.

For example, the table 114 is provided by the operator of the system 2.

By way of an illustration, the value of the index $IC_T$ for each terminal is the sum of the rating points obtained by this terminal for several different security criteria.

The following table gives an example of a rating scale:

| Safety Criterion | Rating if this criterion is met | Rating if this criterion is not met |
|---|---|---|
| The cryptographic processing operations are executed by a security processor | 50 | 0 |
| The execution code for the cryptographic processing operations is encrypted in a non-volatile memory | 15 | 0 |
| The execution code for the cryptographic processing operations is encrypted in a volatile memory during the execution of this code | 30 | 0 |
| A method for concealing the execution code for the cryptographic processing operations is performed to make it difficult to observe its running | 5 | 0 |

The value of the index $IC_T$ for a given terminal is the sum of the rating points obtained for each of the security criteria indicated in the above table. For example, if a terminal uses a security processor and has an execution code for cryptographic processing encrypted in a non-volatile memory, then the index $IC_T$ of this terminal is equal to 65. The index $IC_T$ is associated with each identifier of the terminal stored in a database and accessible to the control word server.

FIG. 4 shows an example of a possible structure for the table 116. This table 116 associates a trust index $IC_c$ with each channel identifier i, this trust index representing the probability that the multimedia content is the victim of a hacking attempt. This index $IC_c$ also represents the extent of the damaging consequences if the security of the control words for decrypting this channel I were to be compromised. This index $IC_c$ therefore also represents the probability that the security of the control words stored in a terminal is compromised. Indeed, the lower the utility of illegally descrambling a multimedia content, the lower the probability that the security of the control words enabling this multimedia content to be descrambled will be compromised. For example, there is no utility in compromising the security of control words for descrambling a freely broadcast channel, i.e. a channel that can be viewed in plain form without any subscription being needed for it. On the contrary, the utility of illegally descrambling a multimedia content increases with the value of this multimedia content. For example, a channel on which recent films are broadcast is associated with a low index $IC_c$ since there is a greater risk that the security of the control words used to descramble it will be compromised.

Here, the table 116 has two columns. Each row of this table 116 has a field containing the identifier i and a field associating an index value $IC_c$ with this identifier i. The table 116 is provided for example by an operator of the system 2.

The working of the system 2 shall now be described in greater detail with reference to the method of FIG. 5.

Initially, at a step 120, the device 6 broadcasts several different multimedia contents simultaneously on different channels. On each channel, the cryptoperiod t and the next cryptoperiod t+1 are scrambled with the control words, respectively $CW_{i,t}$ and $CW_{i,t+1}$. The ECMs containing the cryptograms $CW^*_{i,t}$ and $CW^*_{i,t+1}$ are multiplexed with the broadcast multimedia contents. This multiplexing enables the broadcasting of the control words to be synchronized with the broadcasting of the multimedia contents. Here, the cryptograms $CW^*_{i,t}$ and $CW^*_{i,t+1}$ are transmitted to the terminals during the cryptoperiod t−1 preceding the cryptoperiod t.

Typically, the ECMs are repeated several times within a same cryptoperiod. For example, the ECMs are repeated every 0.1 second to 0.5 second. The duration of a cryptoperiod is greater than 5 seconds and preferably ranges from 5 seconds to 10 minutes.

The scrambled multimedia contents are received appreciably at the same time by each of the terminals 10 to 12. The next steps are therefore executed appreciably in parallel for each of these terminals. The next steps are described in the particular case of the terminal 10.

At a step 122, the scrambled multimedia contents with the ECM messages are received by the terminal 10.

Then, at a step 124, the demultiplexer 72 extracts the scrambled multimedia content corresponding to the channel i, the descrambling of which is currently being requested by the user. At the step 124, the demultiplexer 72 also extracts the ECM messages containing the cryptograms of the control words used to descramble this same channel. The multiplexer 72 transmits the extracted multimedia content towards the descrambler 74. The ECM messages extracted for their part are sent to the processor 76.

At a step 126, the processor 76 makes a search in the table 79 to see if it already contains the control word $CW_{i,t}$ of the next cryptoperiod to be descrambled of the channel i.

If the search gives a positive result, then the processor 76 carries out a phase 127 for descrambling the cryptoperiod t broadcast on the channel i.

More specifically, at a step 128, the processor 76 sends the descrambler 74 the control words $CW_{i,t}$ found in the table 79. No request to decrypt the cryptograms $CW^*_{i,t}$ and $CW^*_{i,t+1}$ is then transmitted to the server 106.

Then, at a step 130, the descrambler 74 descrambles the cryptoperiod t of the multimedia content received by means of this control word $CW_{i,t}$.

Then, at a step 132, the descrambled multimedia content is decoded by the decoder 80 and then transmitted to the video card 82.

Finally, at a step 134, the video card 82 transmits the video signal to the display unit 84 so that the multimedia content is displayed on the screen 86 so as to be directly perceptible and comprehensible to a human being.

If the control word $CW_{i,t}$ is not contained in the table 79, then during a step 140 the terminal 10, during the cryptoperiod t−1, sends a request to the server 106 to decrypt the cryptograms $CW^*_{i,t}$ and $CW^*_{i,t+1}$ contained in the received ECM. For example, this request contains:
- the ECM received and therefore the pair of cryptograms $CW^*_{i,t}/CW^*_{i,t+1}$, and
- an identifier $Id_u$ of the user of the terminal that has sent the request.

This request is transmitted to the server 106 by means of the sender 88 and the network 92. All the information exchanges between the terminal 10 and the server 106 are done by means of a secured tunnel set up through the network 92. The setting up of the tunnel requires the authentication and identification of the terminal by the server 106, for example by a means of the cryptographic certificate contained in the memory 78. Thus, the server 106 has, at its disposal, the identifier $Id_T$ of the terminal that has sent it a request.

At a step 142, in response to the reception of this request, the module 108 extracts the access entitlements associated with the identifier $Id_u$ and contained within this request from the base 102. Then, the module 108 compares the access entitlements extracted with the access conditions CA contained in the request.

If the user's access entitlements do not correspond to the conditions of access CA then the server 106 performs a step 144 for inhibiting the descrambling of the channel i by the terminal 10. For example, to this end, the server 106 transmits no control word to the terminal 10.

If not, the server 106 performs a step 146 for updating a profile of the user. The user's profile contains information to determine the probable duration for which the user of the terminal 10 will continue to descramble the same channel i. This user profile therefore makes it possible to determine the probable number of successive cryptoperiods of the channel i which will be descrambled.

This probability depends especially on the habits of the user of the terminal 10. To this end, at the step 146, the server 106 checks to see if the received request is asking for the descrambling of the control words for a new channel. If the answer is yes, it means that the user has changed channels. In this case, it records in a data base the instant at which the user has left the old channel and the instant at which the user has switched to the new channel in a database. The serve 106 also records the identifier i of the new channel to which the user has switched. The information recorded in this data base therefore enables an estimation of the number of successive cryptoperiods that the user of the terminal 10 will view.

Preferably, the data recorded in this data base is preserved for a very great duration so as to refine the computed probability on the basis of the data recorded in this data base.

Furthermore, at the step 146, the server 106 builds an index of reliability of this user profile. This index of reliability indicates the degree of trust that can be placed in the currently registered user profile. For example, to this end, the server 106 computes the differences between the same probabilities computed by means of the current user profile and by means of the information contained in this same data base some time earlier. The greater this difference, the lower the trust index. Indeed, this means that the user profile is not stable and that it is therefore not possible to give a great degree of trust to this profile.

Then, at a step 148, the server 106 builds the index $IC_T$ of the terminal 10. To this end, it extracts the value of this index $IC_T$ from the table 114 on the basis of the identifier $Id_T$ of the terminal 10 received, for example at the authentication of the terminal during the phase for setting up the secured tunnel.

At a step 150, the server 106 builds a trust index $IC_u$ on the use of the terminal. This index $IC_u$ represents the probability that the terminal is presently undergoing a hacking attack designed to compromise the security of the control words stored in it. This index $IC_u$ therefore also represents the probability that the security of the control words stored in this terminal is compromised.

The value of this index $IC_u$ for a given terminal is built from the values of the error counters $C_1$ to $C_4$.

More specifically, during an operation 152, whenever a request is transmitted by the terminal 10, the error counters $C_1$ to $C_4$ are updated.

Here, the counter $C_1$ represents the number of channel changes per hour.

The counter $C_2$ represents the number of identical requests sent by the terminal 10 to the server 106 per minute. Indeed, during normal operation, each request transmitted by the terminal 10 to the server 106 must be different to the previous one. Thus, the reception of several identical requests raises suspicion of an abnormal use of the terminal 10 and therefore of a possible attempt to compromise the security of the control words stored in this terminal.

The counter $C_3$ enumerates the number of times in which the integrity of the ECM received in the request was not verified for 24 hours. The integrity of the ECM of a request is verified when the signature applied to the different fields of the ECM makes it possible to retrieve the MAC signature contained in this message. If not, it means the ECM has been corrupted.

Finally, the counter $C_4$ counts the number of ECMs having an incorrect syntax transmitted by the terminal 10 to the server 106 per 24 hours.

Then, at an operation 154, the value of each of these counters $C_1$ to $C_4$ is converted into a rating which is all the lower as the current working of the terminal is abnormal. For example, tables for converting the values of the counters into rating values are used. By way of an illustration, the following tables are used.

| Number of channel changes per hour | NBZ_Rating |
|---|---|
| Less than 100 | 100 |
| Between 100 and 360 | 50 |
| Between 360 and 450 | 20 |
| Greater than 450 | 0 |

| Number of identical requests per minute | NBR_Rating |
|---|---|
| Equal to 0 | 100 |
| Between 1 and 2 | 50 |
| Strictly greater than 2 | 0 |

| Number of ECMs corrupted per 24 hours. | NBA_Rating |
|---|---|
| Equal to 0 | 100 |
| Greater than or equal to 1 and strictly below 4 | 50 |
| Greater than or equal to 4 | 0 |

| Number of syntax errors per 24 hours | NBE_Rating |
|---|---|
| Equal to 0 | 100 |
| Greater than or equal to 2 and strictly below 6 | 50 |
| Greater than or equal to 6 | 0 |

In an operation 156, the value of the index $IC_u$ is computed as a function of the counter $C_1$ to $C_4$ converted into a rating. For example, the value of the index $IC_u$ is determined by means of the following relationship:

$$IC_u = \min\{NBZ\_Rating, NBZ\_Rating, NBA\_Rating, NBE\_Rating\}$$

where "min" is the function which returns the minimum of the different values contained between the brackets.

The value of the indicator $IC_u$ can possibly be computed by means of other relationships. For example, the following relationship can also be used;

$$IC_u = (rating\_NBZ + rating\_NBR + rating\_NBA + rating\_NBE)/4$$

At a step 160, the server 106 builds the index $IC_c$ associated with the channel i currently descrambled by the terminal 10. To this end, it extracts the index $IC_c$ associated with this identifier i in the table 116.

At the step 164, the server 106 determines a number NbCP of control words to be transmitted to the terminal 10 in response to its request. This number NbCP can be greater than two which means that, in addition to the absent control words $CW_{i,t}$ and $CW_{i,t+1}$ required by the terminal 10, the server 106 itself can also transmit additional control words $CW_s$ used to descramble additional cryptoperiods of the channel i without the terminal 10 having even transmitted cryptograms to the server 106 that correspond to these additional control words $CW_s$.

The number NbCP is chosen to be all the greater as the probability is low that the security of the additional control words transmitted to this terminal 10 is compromised. To this end, the number NbCP is determined as a function of the previously built trust indices $IC_T$, $IC_u$ and $IC_c$.

For example, at an operation 166, a maximum number NbMaxCP of control words to be transmitted to the terminal 10 is first of all computed as a function of the indices $IC_T$, $IC_u$ and $IC_c$. Here, the value of this maximum number NbMaxCP is computed by means of the following table:

| Threshold for the index IC | Threshold for the index IC | Threshold for the index IC | Value of NbMaxCP |
|---|---|---|---|
| 0 | 0 | 0 | 0 |
| 65 | 60 | 0 | 1 |
| 20 | 50 | 50 | 1 |
| 65 | 50 | 50 | 5 |
| 20 | 50 | 100 | 5 |
| 65 | 50 | 100 | 10 |

The value of the number NbMaxCP chosen is the maximum value in the right-hand column of the above table for which the indices $IC_T$, $IC_u$ and $IC_c$ each exceed the value of a respective threshold indicated on the same row. For example, if the built values of the indices $IC_T$, $IC_u$ and $IC_c$ are respectively 70, 54 and 100, the value of the number NbMaxCP is equal to 10.

Then, during an operation 168, the number NbMaxCP is adjusted to the user's profile determined at the step 146. Typically, the value of the number NbMaxCP is diminished if the probability of the user remaining on the channel i during successive NbMaxCP cryptoperiods is below a predetermined threshold.

Then, in an operation 170, the value of the number NbMaxCP is compared with 0. If the value of this number is null, then the server 106 inhibits the descrambling of the following cryptoperiods of the channel i. To this end, it carries out the step 144.

If not, the number NbCP is temporarily taken to be equal to the number NbMaxCP.

Then, in an operation 172, the number NbCP is adjusted so as to distribute the workload of the server 106 as uniformly as possible over each of the following cryptoperiods. To this end, the server 106 adjusts the value of the number NbCP as a function of:
- estimations of the workload of the servers 106 on each of the coming cryptoperiods, and
- a law delivering the final value of the number NbCP of control words to be transmitted enabling the more uniform distribution of the workload of the server 106 in each of the coming cryptoperiods.

Here, the workload of the server 106 is measured by the probable number of requests to be processed by this server 106 during a same cryptoperiod.

As an illustration, the estimations of the workload for the ten next coming cryptoperiods are stored in a workload table. An example of such a table is given here below.

| Identifier of the channel | No. of the cryptoperiod | | | | | | | | | |
|---|---|---|---|---|---|---|---|---|---|---|
| | t | t + 1 | t + 2 | t + 3 | t + 4 | t + 5 | t + 6 | t + 7 | t + 8 | t + 9 |
| 1 | 11000 | 8464 | 8891 | 6712 | 5998 | 11865 | 8011 | 7776 | 8612 | 12567 |
| 2 | 12007 | 6801 | 11128 | 10218 | 9996 | 9857 | 6850 | 6880 | 7589 | 8359 |
| 3 | ... | ... | ... | ... | ... | ... | ... | ... | ... | ... |
| i | 22963 | 21117 | 22546 | 22989 | 23151 | 17896 | 15069 | 15033 | 15077 | 14211 |
| N | 880 | 891 | 765 | 610 | 877 | 880 | 910 | 898 | 961 | 499 |

Here, the law that delivers the final value of the number NbCP is built to optimize the following two criteria:

1) NbCP should be equal to or as close as possible to its maximum value NbMaxCP, and
2) the value of the number NbCP should enable the distribution of the workload of the server 106 more uniformly over each of the next ten coming cryptoperiods.

For example, the law used is the following:

$$NbCP = \text{Min}\{Load_i(j) * K^{(NbMaxCP-j)}\}$$

where:
- Load(j) is the workload of the server 106 during the cryptoperiod j for the descrambling of the channel i;
- K is a constant strictly greater than 1;
- j is an integer varying from t to NbMaxCP.

For example, using this law and using the values contained in the previous table, when the channel i is the second channel, the value NbCP is equal to 8 if the constant K is equal to 1.1 and NbMaxCP is equal to 10.

Finally, the closer the constant K is to 1, the greater the extent to which the adjusted number NbCP is allowed to be distant from the value of the number NbMaxCP.

Once the number NbCP has been determined, the estimation of the workload of the server 106 is updated in the step 174. To this end, the following two assumptions are made:
1) the user does not change any channel, and
2) the next request is transmitted by the terminal during the cryptoperiod that precedes the cryptoperiod for which no control word has been transmitted to it.

Consequently, with these assumptions, the next request transmitted by the terminal 10 is situated during the cryptoperiod t+NbCp-2. The value of the estimation of the workload of the server 106 for the channel i is therefore incremented during the cryptoperiod t+NbCP-2 by a determined step value. For example, the step value is typically equal to one. This value is stored in the workload table described here above.

At the step 174, at the end of the current cryptoperiod t−1, the column corresponding to the cryptoperiod t is erased from the workload table and the columns corresponding to the cryptoperiods t+1 to t+9 are shifted leftward by one column. This releases a blank column for the new cryptoperiod t+9.

Then, at a step 176, the control words needed to descramble the successive cryptoperiods t to t+NbCP−1 are extracted from the table 112.

At the step 178, the NbCP extracted control words are transmitted to the terminal 10 so that it can descramble the next NbCP cryptoperiods of the channel $\underline{i}$ without having to send a request to the server 106. This therefore diminishes the workload of the server 106 since the frequency of the request diminishes at least for certain terminals. However, the security of the system 2 is not compromised since only the terminals where the probability is low that the security of the control words transmitted is compromised will benefit from the reception of additional control words.

At the step 178, possibly the server 106 also transmits control words for channels other than the channel $\underline{i}$. This makes it possible especially to accelerate the descrambling of the new channel after the switching from the previous channel to the new channel. This also diminishes the workload of the server 106 since, in response to a change in channel, the terminal does not necessarily send a new request to the control word server. The number of control words for the channels other than the channel $\underline{i}$ transmitted during the step 178 is determined for example in the same way as is described for the channel $\underline{i}$ or by another method.

Finally, at a step 180, the terminal 10 receives the new control words and records them in the table 79 to enable their use to descramble the following cryptoperiods of the channel $\underline{i}$.

To implement the method of FIG. 5, the table 112 must be updated permanently so that it contains in advance the control words needed to descramble the coming cryptoperiods of each of the channels. To this end, the method of FIG. 6 is implemented. At a step 190, the control word generator 32 generates in advance the control words that will be used to scramble the coming cryptoperiods of the broadcast multimedia contents. For example, the generator 32 generates between 2 and 100 control words and preferably between 10 and 30 control words in advance.

At a step 192, these control words are transmitted to the server 106 which records them in the table 112 so that this table still contains the control words needed to descramble the cryptoperiods t, t+1, t+2, etc. For example, these control words are transmitted to the server 106 by means of a secured link directly connecting the device 6 to the headend 90.

At a step 194, the server 106 updates the table 112 by means of the additional control words received. So as to enable the display of delinearized multimedia contents, the server 106 also keeps the recordings corresponding to past cryptoperiods in the table 112.

Many other embodiments are possible. For example, trust indices other than those described here can be used to estimate the probability that the security of the control words stored in a given terminal is compromised. Similarly, other modes of computing trust indices $IC_T$, $IC_u$ and $IC_c$ can be implemented. For example, the value of the index $IC_c$ may be computed as a function of the measurement of the current audience of the channel $\underline{i}$ descrambled by the terminal and not, as described previously, from predetermined values recorded in the table 116.

The number NbCP can be determined on the basis of one or only two of the indices $IC_T$, $IC_u$ and $IC_c$.

Similarly, other modes of computing the number NbCP are possible. For example, the number NbMaxCP can be obtained from other formula such as for example by means of the following relationship:

$$NbMaxCP = E(10 \times (IC_T + IC_u + IC_c)/300)$$

where E is the integer part function or floor function.

In another embodiment, the user profile is not used to determine the number NbCP.

There are also other methods for adjusting the number NbCP to distribute the workload of the server 106. For example, to distribute the workload over different cryptoperiods, it is not necessary to estimate the workload on each of these cryptoperiods. For example, adjusting the number NbCP consists in randomly or pseudo-randomly drawing a number ranging from 1 to NbMaxCP.

The estimation of the workload taken into account for the adjustment of the number NbCP can be the estimation of an overall workload for all the channels and not, as described here above, a channel-by-channel estimation. For example, the overall load during a cryptoperiod is obtained by summing up the workloads of the server 106 for each of the channels i during the same cryptoperiod.

The cryptogram of the control word or control words contained in the request transmitted to the server 106 by the terminal can be the identifier of the channel to be descrambled as well as the number or timestamp of the next cryptoperiod on this channel to be descrambled. In such an embodiment, it is then not necessary for the transmitted request to contain, in addition, a cryptogram of the control word $CW_{i,t}$ obtained by encrypting this control word by means of a secret key. Indeed, the identifier of the channel and the number of the next cryptoperiod are sufficient on their own for the server 106 to retrieve, in the table 112, the control word to be sent to the terminal in response to this request.

The updating of the profile of the user can be done differently. In particular, in another embodiment, it is the terminal that detects the changes in channels, and, at each channel change, sends a corresponding piece of information to the server 106 so that it can update the profile of the user of this terminal. In this case, it is possible to take account of the channel changes even if they are not associated with the immediate transmission of a new request to the server 106. Indeed, the control word used to descramble the new channel can already have been received in advance and can be stored in the table 79.

Here, the tables 112, 114 and 116 as well as the counters $C_1$ to $C_4$ have been represented as being contained in the memory 110. However, these tables can be contained elsewhere in the system 2 and for example in a memory that can be interrogated remotely by the server 106.

In another embodiment, the control words transmitted from the server to the terminal are transmitted in an encrypted form so that only the destination terminal of this control word can decipher these control words. In such a case, the implementation of a secured tunnel can be omitted.

In one variant of the system 2, the control word $CW_{i,t}$ is transmitted during the cryptoperiod t and not during the cryptoperiod t−1.

The above description can be applied as much to linearized multimedia contents as to delinearized multimedia contents.

The invention claimed is:

1. A method of decrypting control words for a plurality of terminals, said plurality of terminals comprising terminals that are mechanically and electronically independent of one another, said plurality of terminals comprising a terminal that has detected an absence of at least one control word to descramble at least one cryptoperiod of multimedia content, said method comprising, at a control-word server that is in data communication with said plurality of terminals, receiving, from said terminal that has detected an absence of at least one control word to descramble at least one cryptoperiod of multimedia content, a request containing at least one cryptogram corresponding to said absent control word and, in response to receiving said request containing at least one cryptogram corresponding to said absent control word, causing said control-word server to transmit said absent control word to said terminal, determining a probability that security of additional control words is compromised in said terminal, causing said control-word server to determine, for said terminal, a number of additional control words to be transmitted to said terminal as a function of said probability that security of said additional control words is compromised, and causing said control-word server to transmit, to said terminal, in addition to said absent control word, said determined number of additional control words to enable said terminal to descramble additional cryptoperiods of said multimedia content in addition to a cryptoperiod of said multimedia content that can be descrambled using said absent control word.

2. A method of transmitting control words to terminals that are mechanically and electronically independent of one another, said method comprising transmitting, to a terminal, at least one absent control word in response to a request from said terminal that contains at least one cryptogram corresponding to said at least one absent control word, building a probability that security of additional control words is compromised in said terminal, for said terminal, selectively determining a number of additional control words to be transmitted to said terminal as a function of said probability that security of said additional control words is compromised, and transmitting, to said terminal, in addition to said at least one absent control word, said determined number of additional control words to enable said terminal to descramble at least one additional cryptoperiod of said multimedia content in addition to said at least one cryptoperiod of said multimedia content that can be descrambled using said at least one absent control word.

3. The method of claim 2, further comprising adjusting said determined number of additional control words as a function of estimates of a number of requests to be processed by a control-word server during coming cryptoperiods, and a rule for delivering a number of additional control words to be transmitted for enabling more uniform distribution, over coming cryptoperiods, of a number of requests to be processed by said control-word server during each of said coming cryptoperiods as a function of said estimates.

4. The method of claim 3, wherein said control-word server estimates a number of requests to be processed during a coming cryptoperiod at least in part on the basis of a number of additional control words transmitted to said terminals by said control-word server during past cryptoperiods and a present cryptoperiod.

5. The method of claim 2, wherein selectively determining a number of additional control words to be transmitted to said terminal as a function of a probability that security of the additional control words is compromised comprises determining said number of additional control words as a function of a random number, drawn in a manner selected from a group consisting of randomly and pseudo-randomly, in a range of numbers, said range of numbers having an extent that is a function of said probability that the security of control words stored in said terminal is compromised.

6. The method of claim 2, further comprising adjusting the number of additional control words as a function of a probable number of successive cryptoperiods of multimedia content to be descrambled by said terminal.

7. The method of claim 2, wherein said probability that security of said additional control words is compromised depends at least in part on an identifier of said terminal.

8. The method of claim 2, wherein said probability that security of said additional control words is compromised depends at least in part on a counter of operating errors associated with said terminal.

9. The method of claim 2, wherein said probability that security of said additional control words is compromised depends at least in part on an identifier associated with said multimedia content.

10. A method for receiving control words, said method comprising in response to absence from said terminal of at least one control word to descramble at least one cryptoperiod of multimedia content, causing said terminal to send, to a control-word server, a request containing at least one cryptogram corresponding to said at least one absent control word, and receiving, at said terminal, in addition to said at least one absent control word, a determined number of additional control words to enable said terminal to descramble additional cryptoperiods of said multimedia content in addition to said at least one cryptoperiod of said multimedia content capable of being descrambled using said at least one absent control word, wherein said number of additional control words is selected based on a probability that security of additional control words is compromised in said terminal.

11. A manufacture comprising a tangible and non-transitory information-recording medium having encoded thereon instructions to execute a method of decrypting control words for a plurality of terminals, said plurality of terminals comprising terminals that are mechanically and electronically independent of one another, said plurality of terminals comprising a terminal that has detected an absence of at least one control word to descramble at least one cryptoperiod of multimedia content when said instructions are executed by an electronic computer, wherein said instructions comprise instructions for at a control-word server, receiving, from said terminal, a request containing at least one cryptogram corresponding to said absent control word and, in response, causing said control-word server to transmit said absent control word to said terminal, determining a probability that security of additional control words is compromised in said terminal, causing said control-word server to determine, for said terminal, a number of additional control words to be transmitted to said terminal as a function of said probability that security of said additional control words is compromised, and causing said control-word server to transmit, to said terminal, in addition to said absent control word, said determined number of additional control words to enable said terminal to descramble additional cryptoperiods of said multimedia content in addition to a cryptoperiod of said multimedia content that can be descrambled using said absent control word.

12. An apparatus comprising a control-word server for transmitting control words to terminals that are mechanically and electronically independent of one another, said control-word server being programmed for transmitting at least one absent control word to any one of said terminals in response to a request from said terminal containing at least one cryptogram associated with said at least one absent control word, said control-word server being further programmed for each of said terminals, determining a probability that security of additional control words is compromised in said terminal, and determining, selectively for each terminal, a number of additional control words to be transmitted to a terminal as a function of said probability that security of said additional control words is compromised, and said control-word server being further programmed for transmitting, to said terminal, in addition to said at least one absent control word, said determined number of additional control words to enable said terminal to descramble at least one additional cryptoperiod of multimedia content in addition to at least one cryptoperiod of said multimedia content that can be descrambled using said at least one absent control word.

* * * * *